Jan. 22, 1924.
J. E. GARRETTE
VEGETABLE PEELING MACHINE
Filed July 13, 1921
1,481,547
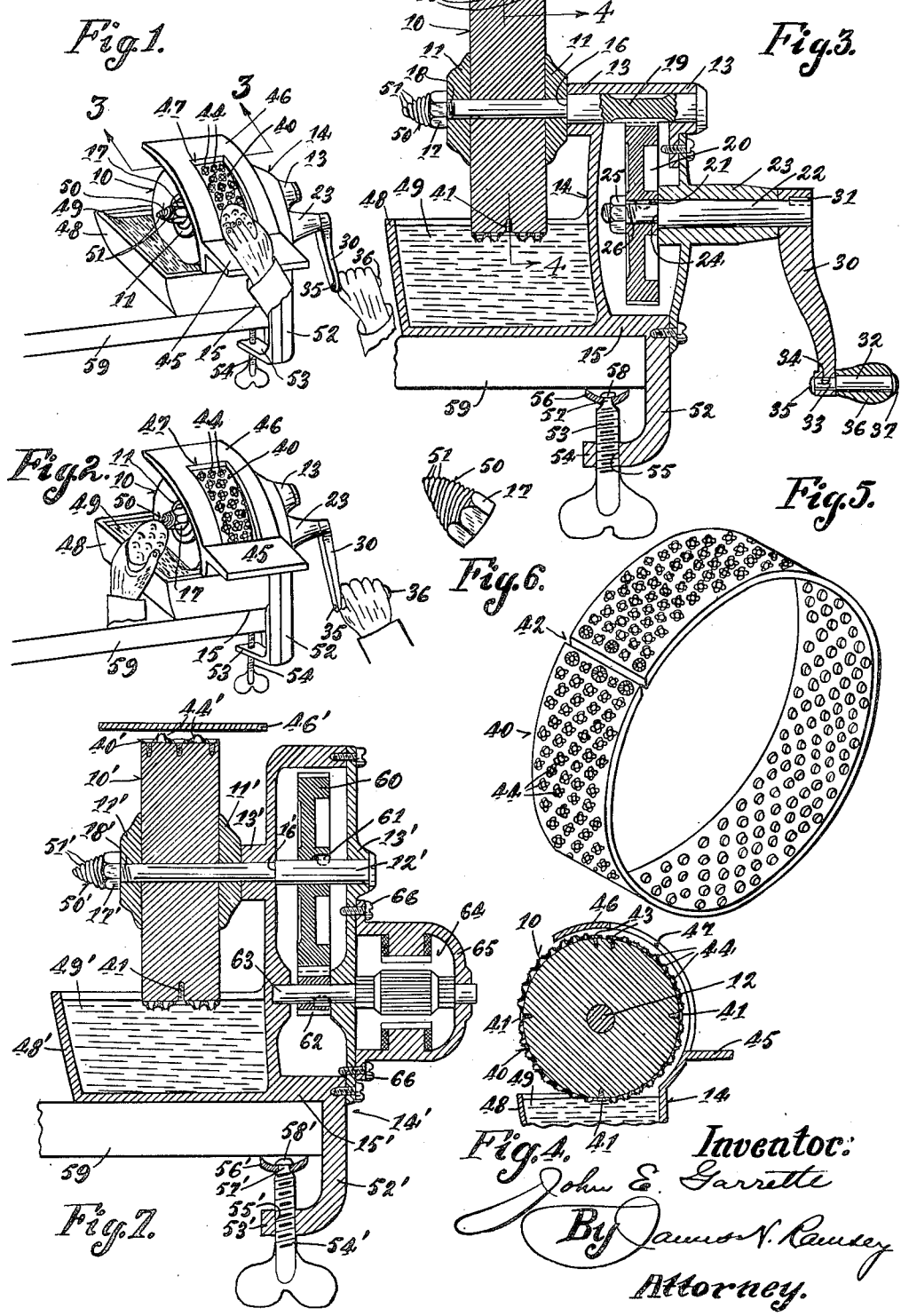

Patented Jan. 22, 1924.

1,481,547

UNITED STATES PATENT OFFICE.

JOHN E. GARRETTE, OF CINCINNATI, OHIO, ASSIGNOR OF ONE-HALF TO GEORGE M. LUCE, OF CHICAGO, ILLINOIS.

VEGETABLE-PEELING MACHINE.

Application filed July 13, 1921. Serial No. 484,484.

*To all whom it may concern:*

Be it known that I, JOHN E. GARRETTE, a citizen of the United States, residing at Cincinnati, in the county of Hamilton and State of Ohio, have invented certain new and useful Improvements in Vegetable-Peeling Machines, of which the following is a specification.

My invention relates to machines for removing the peelings of vegetables, such as potatoes, carrots, turnips and the like. Heretofore vegetables such as potatoes have been peeled by hand by the aid of an ordinary knife which is a slow and tedious operation. Also a great deal of the meat of the vegetable has been wasted, as it is very difficult to remove the peel without carrying away a part of the meat also.

It is the object of my invention to provide a machine for readily and rapidly removing the peel from vegetables and the like; further to provide a rotary cutting means to remove the peel and blemishes from vegetables; further to provide a driving means for said rotary cutting means; further to provide a means of supporting the vegetable while being peeled; further to provide automatic means to prevent the cutting means from becoming clogged with the peel cut from the vegetable; and further to provide a receptacle for receiving the cut peeling.

My invention consists in the provision of a vegetable peeling machine embodying a rotary cutting means adapted to remove the peel from vegetables when held in contact therewith; further in the conical rotary cutting means for removing the blemishes from vegetables; further in the actuating means for the rotary cutting means, further in the receptacle adapted to contain a fluid through which said rotary cutting means passes and thereby effecting the removal of the peeled matter therefrom; further in the means for supporting the vegetable to be peeled; and further in the means whereby the fluid and the peeled matter are prevented from being thrown on the surroundings.

My invention further consists in the parts and combination and arrangement of parts as herein described and claimed.

In the drawing:

Fig. 1 is a perspective view of my improved device showing the manner in which the device is employed for peeling potatoes;

Fig. 2 is a similar view showing the manner in which the device is employed for removing the eyes from potatoes;

Fig. 3 is a central vertical cross section of the device shown in Fig. 1 and taken in a plane corresponding to the line 3—3 of Fig. 1;

Fig. 4 is a vertical cross section of the rotor showing the manner of securing the removable cutting band and taken in a plane corresponding to the line 4—4 of Fig. 3;

Fig. 5 is a perspective view of the removable cutting band;

Fig. 6 is a perspective view of the cutter for removing the blemishes from vegetables;

Fig. 7 is a central vertical section of my improved device showing a modified form of gearing and driven by an electric motor.

In the embodiment of my invention as illustrated a rotor 10 is mounted between flanges 11 on a rotatable shaft 12 in bearings 13 of a frame 14. The frame has integrally formed therewith a base 15 upon which the device is adapted to rest. The rotor and flanges are held in place on the shaft, as by being clamped against shoulder 16 thereon by a nut 17 having threaded connection 18 with the outer end of the shaft. Integrally formed with the shaft 12 is a pinion 19 which meshes with a gear 20 secured as by a key 21 to a drive shaft 22 journaled in bearing 23 of the frame.

The gear 20 is positioned endwise on the shaft 22 as by being received between a shoulder 24 and a clamp nut 25 having threaded connection 26 with the inner end of the shaft.

A crank 30 is secured to the outer end of the shaft as by a pin 31. In the outer end of the crank is secured a stud 32 as by a reduced portion 33 thereon held in a hole 34 by riveting over its end as shown at 35. On the exposed end of the stud is a handle 36 rotatably held in place by upsetting the end as shown at 37.

The rotor 10 has a removable and flexible cutting band 40 secured thereto as by screws 41. This band is preferably divided as shown at 42 and has screws 43 adjacent its ends for securing the same to the rotor. The band has cutting projections 44 thereon formed by pressing out portions thereof.

To support the vegetable while being worked upon by the cutting band I provide a support 45 adjacent thereto on a curved guard 46 partly encircling the rotor. The guard 46 has a slot 47 therein so as to permit the surface of the vegetable to be presented to the rotor.

Below the rotor preferably integrally formed with the base is located a receptacle 48 adapted to contain a fluid 49 such as water at such a level as will permit the periphery of the rotor to pass therethrough.

Means are provided whereby depressions and blemishes such as the eyes in potatoes may be removed. Therefor the nut 17 has a conical shaped cutter 50 formed thereon having spiral cutting edges 51.

The base has a depending arm 52 integrally formed therewith and has a lug 53 thereon in which a clamp screw 54 has threaded connection 55. The screw has a swivel contact end 56 loosely secured about a reduced end 57 thereof and held in place by riveting over the said reduced end as shown at 58.

In operation the device is clamped for instance to a table 59 by resting the same thereon adjacent one of its corners and drawing up on the clamp screw 54. We will assume for instance that we desire to peel a potato. The potato is held in one hand and permitted to rest on the support 45 while the crank is being turned by the other hand, (see Fig. 1) which rotates the rotor at a comparatively high speed through the medium of the gear 20 and pinion 19. While the crank is being rotated the potato is also being turned on the support to present successively every part of its surface to the cutting actions of the cutting band 40. The eyes of the potato may be removed by presenting the same to the conical cutter 50 on the nut 16 as shown in Fig. 2. Water is placed in the receptacle 48 to such a level as will permit the periphery of the rotor to pass therethrough. As the cutting projections on the cutting band pass the potato in contact therewith, the peel is cut away and carried into the water. The water removes the cut peel from the projections whereupon the particles fall to the bottom of the receptacle. The water also serves as a cutting lubricant to prevent the particles of cut peel from clinging thereto.

In Fig. 6 is shown a modification of my improved device the parts thereof being referred to by similar but primed reference numerals, with the exception of the driving gears. Instead of forming a pinion on the shaft 12' a gear 60 of comparatively large diameter is secured thereon as by a key 61. The gear 60 meshes with a pinion 62 on the armature shaft 63 of an electric motor 64 in a casing 65 held to the frame 14' by screws 66. In this form of my improved device the necessity of manual actuation of the rotor is avoided, both hands being left free for manipulating the vegetable being peeled.

What I claim as new and desire to secure by Letters Patent is:

In a vegetable peeling machine, a rotor, a band thereon having a plurality of cutting projections, a water reservoir, said projections adapted to contact said water, a curved vertically slotted guard mounted over said cutter, a forwardly projecting support in front of said guard and means to operate said rotor, substantially as set forth and for the purposes specified.

JOHN E. GARRETTE.